United States Patent [19]

Takeuchi et al.

[11] Patent Number: 5,724,391
[45] Date of Patent: Mar. 3, 1998

[54] APPARATUS FOR TRANSMISSION OF VARIABLE LENGTH DATA

[75] Inventors: Shunichi Takeuchi, Tokyo; Michinori Masuda, Osaka, both of Japan

[73] Assignee: Matsushita Electric Industrial Co., Ltd., Osaka, Japan

[21] Appl. No.: 717,359

[22] Filed: Sep. 20, 1996

[30] Foreign Application Priority Data

Sep. 20, 1995 [JP] Japan ................................ 7-264715
Feb. 20, 1996 [JP] Japan ................................ 8-055394

[51] Int. Cl.$^6$ ........................................ H04B 1/66
[52] U.S. Cl. ................... 375/240; 375/259; 375/316; 375/295; 341/67; 358/431; 371/2.1
[58] Field of Search ................... 375/240, 253, 375/246, 295, 316, 259; 341/67, 94, 95, 59; 358/261.1, 431; 371/2.1, 37.1

[56] References Cited

U.S. PATENT DOCUMENTS

| | | | |
|---|---|---|---|
| 4,593,267 | 6/1986 | Kuroda et al. | 341/67 |
| 5,111,292 | 5/1992 | Joseph et al. | 375/253 |
| 5,122,875 | 6/1992 | Raychaudhuri et al. | 375/253 |
| 5,168,356 | 12/1992 | Acampora et al. | 375/253 |
| 5,471,594 | 11/1995 | Stone | 341/67 |
| 5,502,571 | 3/1996 | Decotignie et al. | 386/112 |

FOREIGN PATENT DOCUMENTS

57-207960  12/1982  Japan.
5-62363    3/1993   Japan.

Primary Examiner—Stephen Chin
Assistant Examiner—Betsy L. Deppe
Attorney, Agent, or Firm—Lowe, Price, LeBlanc & Becker

[57] ABSTRACT

A variable length data transmission apparatus is provided which includes a transmitter and a receiver. The transmitter splits input variable length data into first code blocks having a block length k to convert them into a plurality of first error-correcting codes having a code length n and including k information symbols. When a data length of the variable length data is not a multiple of the block length k, the transmitter converts part of the variable length data which should be protected from errors with a higher degree of priority into a code block having a length shorter than the block length k and adds dummy bits to the second code block to convert the dummy bit-added second code block into a second error-correcting code, after which the dummy bits are removed from the second error-correcting code to provide a third error-correcting code. The receiver splits a code sequence transmitted from the transmitter into the first and third error-correcting codes for correcting errors arising in the first and third error-correcting codes. The receiver adds the same dummy bits as used in the transmitter to the third error-correcting code to correct the errors in the third error-correcting code, after which the dummy bits are removed from the third error-correcting code.

5 Claims, 6 Drawing Sheets

APPARATUS FOR TRANSMISSION OF VARIABLE LENGTH DATA

BACKGROUND OF THE INVENTION

1. Technical Field

The present invention relates generally to a variable length data transmission apparatus suitable for use in digital radio communication systems, and more particularly to a variable length data transmission apparatus designed to split variable length data into a plurality of data blocks and to protect one of the data blocks of much importance against errors with a higher degree of priority.

2. Background of Related Art

Usually, in digital data radio transmission systems, digital data is protected using error-correcting codes from errors occurring in a radio communication line.

There are known two types of error correction: one is to convolute an information signal in a code every bit of the information signal to form a convolution code and the other is to split an information signal into constant length data blocks to code each of the data blocks using an error-correcting code to form block codes.

Such block codes are easy to design and utilize, but since they are designed basically for error correction of constant length data, error correction of variable length data such as picture data requires splitting of the data into a plurality of data blocks and insertion of dummy bits into one of the data blocks shorter in length than the others to unify the lengths of all the data blocks. A transmitter notifies a receiver of the number of the used dummy bits. The receiver uses dummy bits of the same number as that of the dummy bits used in the transmitter, thereby eliminating the need for transmission of the dummy bits from the transmitter to the receiver through a transmission line. This improves transmission efficiencies.

Japanese Patent First Publication No. 57-207960 teaches a method of error correction using the above described block codes.

Figure 3:
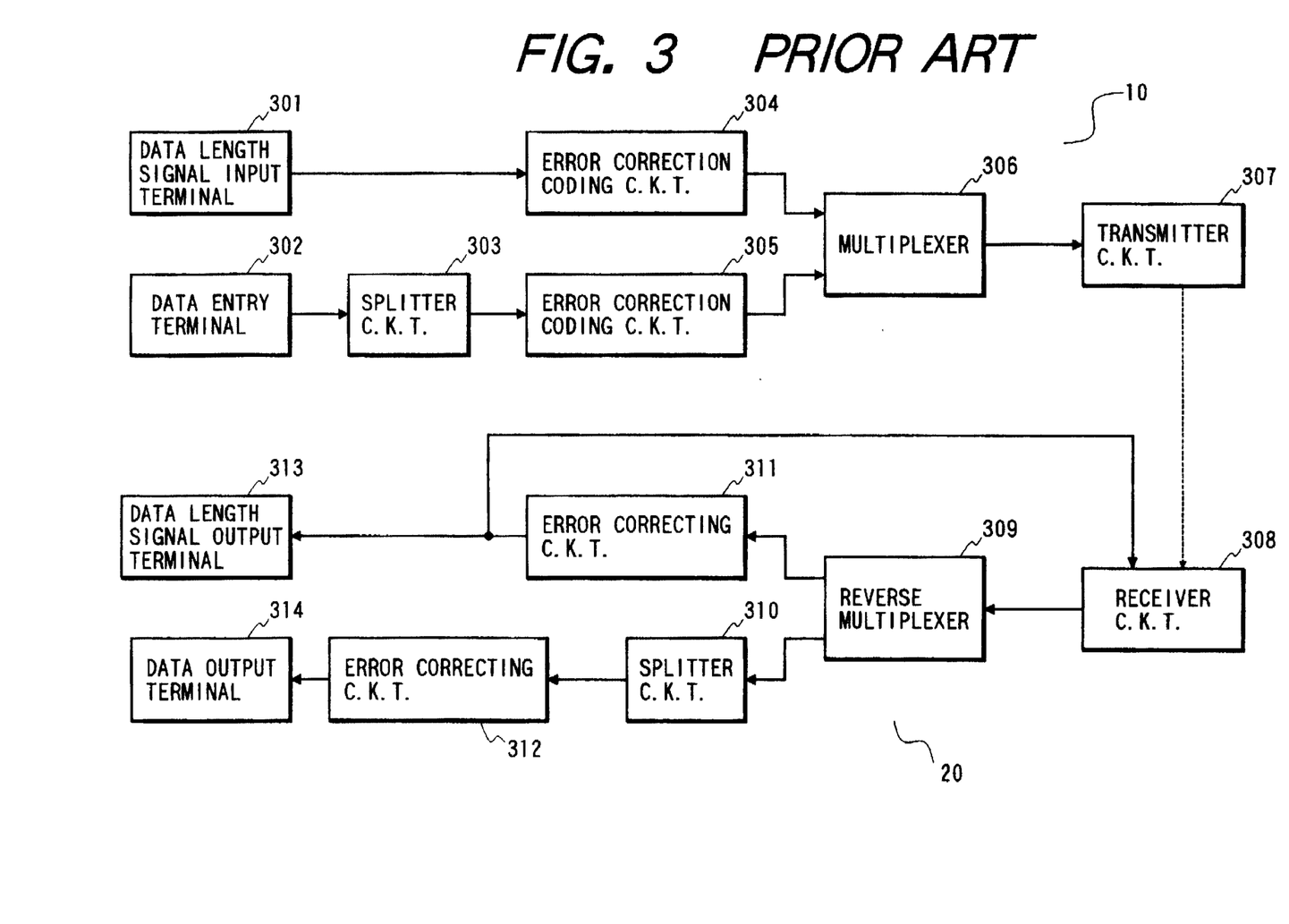
FIG. 3 is a block diagram which shows a conventional variable length data transceiver.

FIG. 3 shows a conventional variable length data transceiver which includes a transmitter 10 and a receiver 20.

The transmitter 10 includes a data length signal input terminal 301, a data entry terminal 302, a splitting circuit 303, a data length signal error correction coding circuit 304, a block signal error correction coding circuit 305, a multiplexing circuit 306, and a transmitter circuit 307.

Variable length data is inputted to the data entry terminal 302. A data length signal indicative of the length of the variable length data entering the data entry terminal 302 is inputted to the data length signal input terminal 301. The splitting circuit 303 splits the input data into data blocks of size allowing the input data to be coded. The data length signal error correction coding circuit 304 subjects the data length signal to error correction coding. The block signal error correction coding circuit 305 subjects the data blocks outputted from the splitting circuit 303 to typical error correction coding to provide a plurality of block signal error-correcting codes. The multiplexing circuit 306 multiplexes a data length signal error-correcting code outputted from the data length signal error correction coding circuit 304 and the block signal error-correcting codes outputted from the block signal error correction coding circuit 305. The transmitter 307 transmits the multiplexed signal to a transmission line.

If the overall length of each of the block signal error-correcting codes provided by the block signal error correction coding circuit 305 includes n bits, of these bits, k bits are assigned to information symbols, and the other bits (n-k) are assigned to check symbols for error correction, this code will be referred to as an (n, k) block code in the following discussion. If the length of one of the data blocks outputted from the splitting circuit 303 corresponds to the number of information symbols k of the (n, k) block code, the block signal error correction coding circuit 305 codes the data blocks without modifying them. Alternatively, if the length of one of the data blocks is smaller than the number of information symbols k, the block signal error correction coding circuit 305 adds to the one of the data blocks dummy bits of a number corresponding to the lack of the length thereof to provide an (n, k) block code, after which the dummy bits are removed from the (n, k) block code to output the dummy bit-removed block code.

The receiver 20 includes a receiver circuit 308, a reverse multiplexing circuit 309, a data length signal error correcting circuit 311, a splitting circuit 310, a block signal error correcting circuit 312, a data length signal output terminal 313, and a data output terminal 314.

The receiver circuit 308 receives an output signal transmitted from the transmitter circuit 307 through the transmission line. The reverse multiplexing circuit 309 splits an output signal from the receiver circuit 308 into the data length signal error-correcting code and a sequence of the block signal error-correcting codes. The data length signal error correcting circuit 311 corrects errors occurring in the data length signal of the data length signal error-correcting code and outputs it to the receiver circuit 308 and the data length signal output terminal 313. The splitting circuit 310 splits the sequence of the block signal error-correcting codes into code units. The block signal error correcting circuit 312 corrects errors occurring in each of the block signal error-correcting codes split by the splitting circuit 310 and provides them to the data output terminal 314.

When the data length of each of the block signal error-correcting codes is equal to the code length n of the (n, k) block code, the block signal error correcting circuit 312 corrects errors arising in the block signal error-correcting codes as they are. Alternatively, when the data length of one of the block signal error-correcting codes is shorter than the code length n, the block signal error correcting circuit 312 inserts the same dummy bits as used in the transmitter 10 to the same location as that to which the dummy bits are inserted in the transmitter 10, corrects errors arising in the block signal error-correcting codes; and then removes the dummy bits therefrom.

When the variable length data inputted from the data entry terminal 302 is greater in data length than the number of information symbols k of the (n, k) block code provided by the block signal error correction coding circuit 305, the splitting circuit 303 splits the variable length data into a plurality of data blocks each consisting of k symbols. Alternatively, when the variable length data is smaller in data length than the number of information symbols k, it is processed in the same manner as that processing a final block, as will be discussed later in detail, without being split through the splitting circuit 303.

The data blocks split by the data length k are subjected through the block signal error correction coding circuit 307 to error correction coding to provide the block signal error-correcting codes. However, the data length of the variable length data may not be divided by k so that the size k1 of a final block of the split block signal error-correcting codes becomes smaller than k, as shown in the equation below.

This usually occurs with higher probabilities as a value of k becomes great.

$$k1<k \quad (1)$$

Figure 4A:
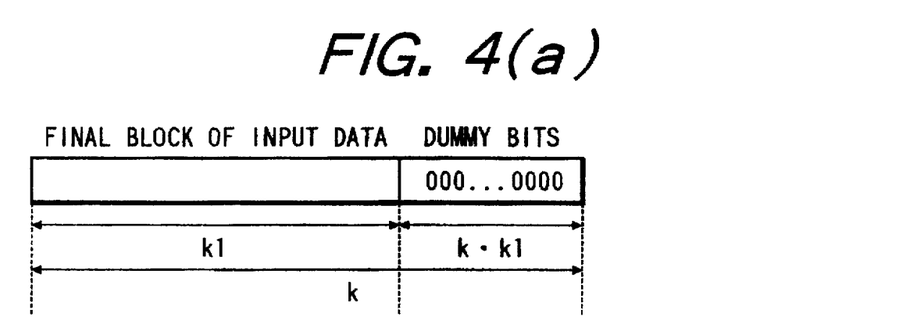
FIG. 4(a) shows a final block of variable length data including dummy bits.

If the final block having the size k1 smaller than k is formed, the block signal error correction coding circuit 305, as shown in FIG. 4(a), adds dummy bits of a number corresponding to x symbols, as represented by the following equation, to the final block so that it can be coded to provide the (n, k) block code.

$$x=k-k1 \quad (2)$$

Figure 4B:
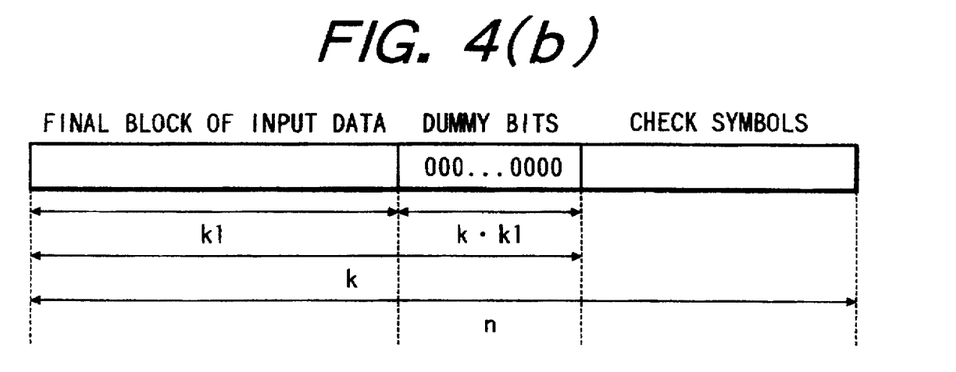
FIG. 4(b) shows a final block of variable length data including dummy bits and check bits for error correction.
Figure 4C:
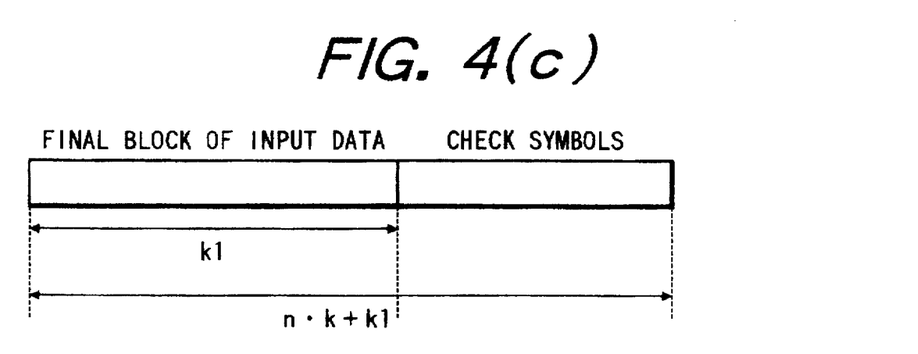
FIG. 4(c) shows a final block of variable length data from which dummy bits are removed after error correction coding.

The (n, k) block code to which the dummy bits are added is then subjected to error correction coding. Specifically, an error-correcting code (i.e., check symbols) is, as shown in FIG. 4(b), inserted into the (n, k) block code. Subsequently, the dummy bits are, as shown in FIG. 4(c), removed from the (n, k) block code.

The data length signal entering at the data length signal input terminal 301 is subjected to error correction coding through the data length signal error correction coding circuit 304 to provide the data length signal error-correcting code to the multiplexing circuit 306. The multiplexing circuit 306, as described above, multiplexes the data length signal error-correcting code outputted from the data length signal error correction coding circuit 304 and the block signal error-correcting codes outputted from the block signal error correction coding circuit 305. The transmitter 307 outputs this multiplexed signal to the transmission line.

The receiver circuit 308, as described above, receives an output signal transmitted from the transmitter circuit 307 through the transmission line. The reverse multiplexing circuit 309 splits an output signal from the receiver circuit 308 into the data length signal error-correcting code and a sequence of the block signal error-correcting codes. The data length signal error correcting circuit 311 corrects errors occurring in the data length signal of the data length signal error-correcting code and outputs it to the receiver circuit 308 and the data length signal output terminal 313. The receiver circuit 308 receives the error-corrected data length signal to know how many bits should be received subsequently.

The splitting circuit 310 splits the sequence of the block signal error-correcting codes by the code length n. The block signal error correcting circuit 312 then corrects errors occurring in the block signal error-correcting codes in blocks (=the code length n) other than a final block. If the final block, as shown in FIG. 4(c), meets the condition in the equation (1), the same dummy bits as used in the transmitter 10 are, as shown in FIG. 4(b), to the final block, after which errors arising in the final block are corrected, and then the dummy bits are removed from the final block.

As apparent from the above discussion, coding the variable length data using an error-correcting code eliminates the need for the dummy bits to be transmitted through the transmission line. This allows the transmission line to be employed effectively. For example, Japanese Patent First Publication No. 5-62363 teaches a record/reproduction system using this type of technique for improving a storage capacity.

Here, if a coding efficiency r of an error-correcting code is defined by the equation (3) below, a coding efficiency r1 of an error-correcting code of the final block on the transmission line resulting from addition of the dummy bits to the final block becomes smaller than a coding efficiency r0 of an error-correcting code of each of the blocks other than the final block.

$$r=k/n \quad (3)$$

For avoiding the above drawback, the convolution codes may be used, however, easy-to-design block codes are more useful in transmission of variable length data although the coding efficiency is reduced slightly since it is difficult to provide high error-correcting ability to the convolution codes.

The above reduction in coding efficiency in the final block causes the redundancy of one information symbol to be increased, resulting in a decreased probability of failure in error correction of the final block.

Note that when variable length data of each line in picture information is split by a constant length in synchronism with the beginning of each line, the final block will be formed every line.

The above prior art variable length data transceiver, however, encounters the following drawbacks.

Only the final block of variable length data is protected against errors strongly as compared with other blocks, but it is not always important to protect information in the final block from errors. Thus, the prior art transceiver has a problem in that it is difficult to employ redundancies effectively.

For example, variable length data may have at its leading portion a data signal which is very important and should be protected with higher degree of priority. If errors arise in the leading portion of the variable length data, it will cause a following portion of the variable length data not to make sense. Thus, the concentration of redundancies on the final block in transmission of such variable length data prevents the redundancies from being used effectively.

If it is necessary to transmit the gross information content of variable length data correctly, uniform redundancies are effective for error correction of the variable length data. In this case, the concentration of redundancies on the final block also prevents the redundancies from being used effectively.

SUMMARY OF THE INVENTION

It is therefore a principal object of the present invention to avoid the disadvantages of the prior art.

It is another object of the present invention to provide an apparatus for transmission of variable length data which is designed to employ redundancies effectively when a coding efficiency of error-correcting codes is reduced.

According to one aspect of the present invention, there is provided an apparatus for transmission of variable length data which comprises a transmitter and a receiver. The transmitter includes a splitting means, an error correction code converting means, and a transmitting means. The splitting means splits the variable length data into first code blocks each having a block length k. When a data length of the variable length data is not a multiple of the block length k, the splitting means converts part of the variable length data to be protected from the errors with a higher degree of priority into a second code block having a length shorter than the block length k. The error correction code converting means converts the first code blocks into first error-correcting codes each including k information symbols and having a code length n. The error correction code converting means adds dummy bits to the second code block to convert the dummy bit-added second code block into a second error-correcting code, after which the dummy bits are removed from the second error-correcting code to provide a third error-correcting code. The transmitting means transmits a code sequence including the first and third error-correcting codes. The receiver includes a receiving means, a splitting means, and an error correcting means. The receiving means receives the code sequence transmitted from the transmitting means. The splitting means splits the code sequence received by the receiving means into the first and third error-correcting codes. The error correcting means corrects errors arising in the first and third error-correcting codes. The error correcting means adds dummy bits to the third error-correcting code to correct the errors in the third error-correcting code, after which the dummy bits are removed from the third error-correcting code.

In the preferred mode of the invention, the transmitter further includes storage means for storing therein prior protection position information which indicates which part of the variable length data should be protected from errors with the higher degree of priority. The splitting means of the transmitter splits the variable length data into the first and second code blocks based on the prior protection position information stored in the storage means.

The receiver further includes storage means for storing therein the same prior protection position information as that stored in the storage means of the transmitter. The splitting means of the receiver identifies the third error-correcting code in the code sequence based on the prior protection position information.

The storage means of the transmitter and the receiver store as the part of the variable length data to be protected from the errors with the higher degree of priority code data of layers, other than a block layer of a moving picture code provided every unit of one frame which is specified by MPEG1 or MPEG2 of the H.261, ISO/IEC standard recommended by the ITU-T.

When the data length of the variable length data does not correspond to a multiple of the block length k, the splitting means of the transmitter may alternatively split the variable length data into code blocks of as similar lengths as possible.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
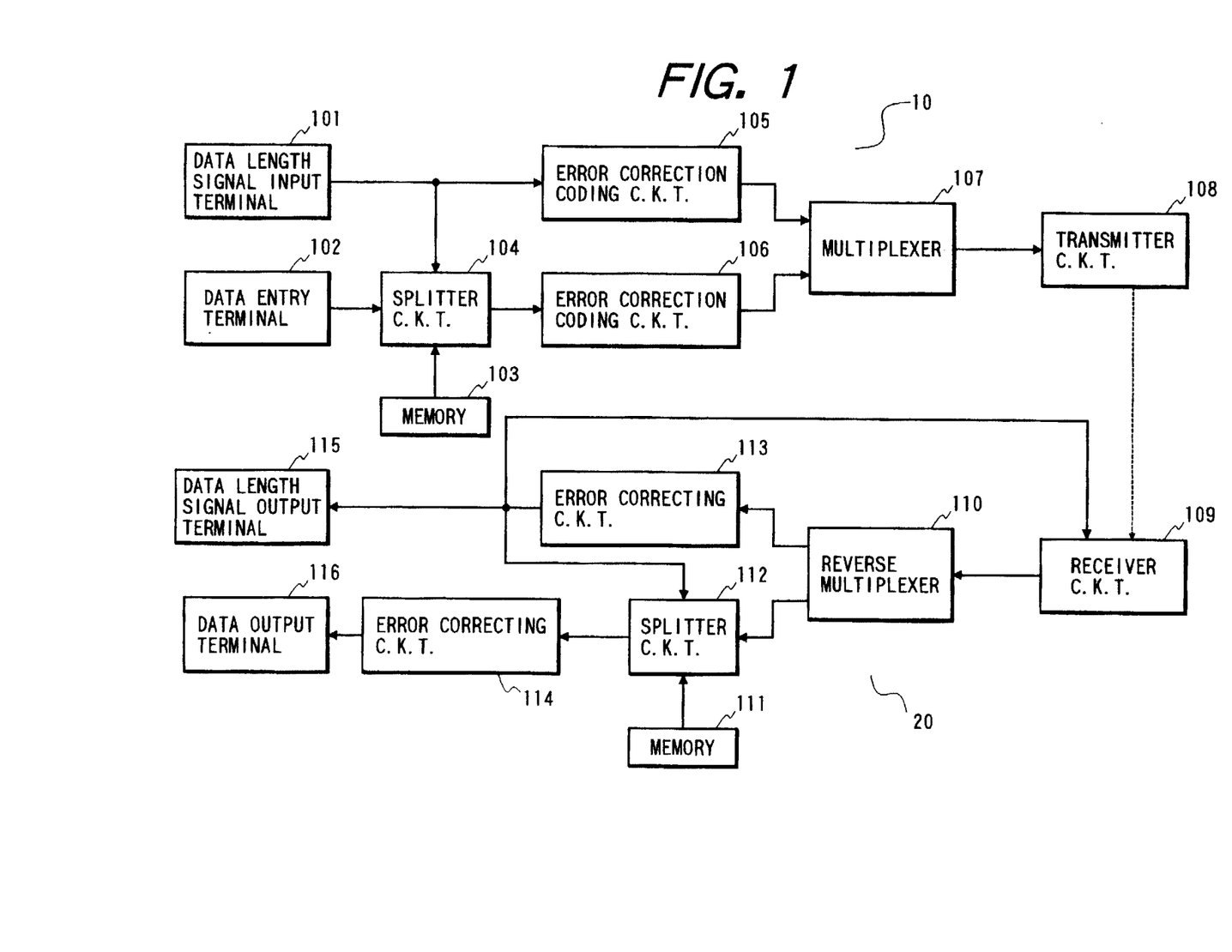
FIG. 1 is a block diagram which shows a variable length data transceiver according the first embodiment of to the present invention.

Referring now to the drawings, particularly to FIG. 1, there is shown a variable length data transceiver according to the present invention which is different from the conventional variable length data transceiver, as shown in FIG. 3, in memories 103 and 111 and splitting circuits 104 and 112. Other arrangements are the same as discussed in the introductory part of this application with reference to FIG. 3, and explanation thereof in detail will be omitted here.

The memory 103 stores therein prior protection position information which indicates which part of input variable length data should be protected from errors with a higher degree of priority using an error-correcting code. The splitting circuit 104 splits variable length data inputted from the data entry terminal 102 into a plurality of blocks so that one of the blocks including part of the variable length data located at a prior protection position becomes shorter in block length than the others. The memory 111 stores therein the same prior protection position information as that stored in the memory 103. The splitting circuit 112, as will be discussed later in detail, splits a sequence of block signal error correcting-codes at an end of each code word coded by the transmitter 10.

In operation of the transmitter 10, when the length of variable length data inputted from the data entry terminal 102 is greater than the number of information symbols k of the (n, k) code used in the block signal error correction coding circuit 106, the splitting circuit 104 splits this data into a plurality of data blocks. Alternatively, when the length of the variable length data is smaller than the number of information symbols k, the splitting circuit 104 transmits the variable length data directly to the block signal error correction coding circuit 106 without splitting it.

Specifically, the splitting circuit 104 divides the data length indicated by a data length signal inputted into the data length signal input terminal 101 by the number of information symbols k of the (n, k) code used in the block signal error correction coding circuit 106 to find the remainder. If the remainder is zero (0) meaning that there is no block to which the block signal error correction coding circuit 106 should add dummy bits, the input variable length data is split equally into data blocks each having a data length of k and then outputted to the block signal error correction coding circuit 106.

If the remainder is not zero (0), a data block is formed which is smaller in length than k and is stronger in error than other blocks each consisting of k information symbols. Specifically, the splitting circuit 104 splits the variable length data using prior protection position information stored in the memory 103 into a plurality of data blocks so that the length of one of the data blocks which should be protected from errors more strongly than the other data blocks becomes shorter than the block length k of the other data blocks and output all the data blocks to the block signal error correction coding circuit 106.

The block signal error correction coding circuit 106 subjects the data blocks having the block length k to error correction coding to form the (n, k) codes (i.e., redundant codes), while it adds dummy bits to one of the data blocks smaller in the length than the block length k and subjects it to the error correction coding to form the (n, k) code, after which the dummy bits are removed therefrom. The block signal error correction coding circuit 106 outputs these (n, k) codes as data block error-correcting codes to the multiplexing circuit 107.

The data length signal inputted into the data length signal input terminal 101 is subjected by the data length signal error correction coding circuit 105 to error correction coding and then outputted to the multiplexing circuit 107 as a data length signal error-correcting code. The multiplexing circuit 107 then multiplexes the data length signal error-correcting code provided by the data length signal error correction coding circuit 105 and the data block error-correcting codes provided by the block signal error correction coding circuit 106. The transmitting circuit 108 then transmits this multiplexed signal to the receiving circuit 109 through a transmission line.

The information signal received by the receiving circuit 109 is split by the reverse multiplexing circuit 110 into the data length error correcting code and a sequence of the data block error correcting codes. The data length error-correcting code is then inputted into the data length signal error correcting circuit 113 wherein errors arising during transmission are corrected to provide an error-corrected data length signal. The error-corrected data length signal is then returned to the receiving circuit 109 to provide it with information about how many bits the receiving circuit 109 should receive subsequently.

The error-corrected data length signal is also inputted to the splitting circuit 112 wherein the data length indicated by the error-corrected data length signal is divided by the number of information symbols k of the same (n, k) codes used in the block signal error correcting circuit 114 as those used in the transmitter 10. If the remainder is zero (0), then a sequence of the block signal error-correcting codes inputted from the reverse multiplexing circuit 110 are split by the code length n of the (n, k) codes.

Alternatively, if the remainder is not zero (0), it is necessary to select a shorter code block out of the sequence of the block signal error-correcting codes based on prior protection position information stored in the memory 111 which is identical with that used in the transmitter 10. Specifically, the splitting circuit 112 selects one of the block signal error-correcting codes located at the prior protection position whose length is shorter than the code length n and equal to a sum of the number of information symbols of the selected one (i.e., the number of symbols of a prior protection object indicated by the prior protection position information) and the number of check symbols of (n-k), while the remaining block signal error-correcting code sequence is separated by the code length n into discrete block signal error-correcting codes.

The block signal error correcting circuit 114 corrects errors occurring in the block signal error-correcting codes outputted from the splitting circuit 112 whose lengths are equal the code length n, respectively, to output them to the data output terminal 116, while it adds the same dummy bits as that used in the transmitter 10 to the selected one of the block signal error-correcting codes located at the prior protection position whose length is shorter than the code length n and corrects errors thereof, after which the dummy bits are removed. The dummy bit-removed code is transmitted to the data output terminal 116.

Figure 5:
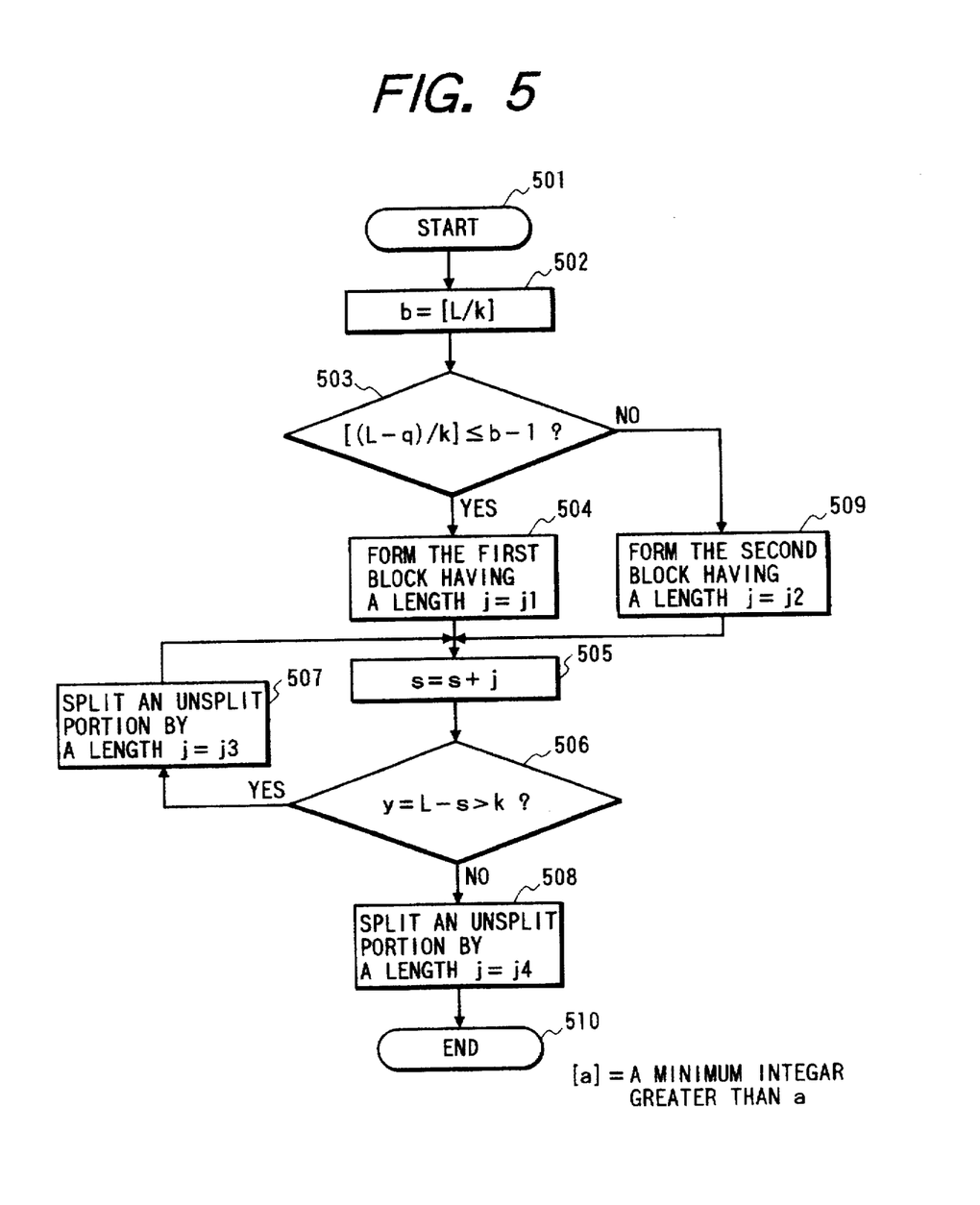
FIG. 5 is a flowchart of a program performed by the transceiver of the first embodiment shown in FIG. 1.

FIG. 5 shows a program or sequence of logical steps for protecting g leading symbols (q<k) of input variable length data from errors prior to other symbols. It is assumed that the memories 103 and 104 of the transmitter 10 and the receiver 20 store therein the prior protection position information indicating that symbols of the input variable length data located from the first symbol position to (q-l)th symbol position should be protected from errors with a higher degree of priority.

Upon input of variable length data having a data length of L and a data length signal to the transmitter 10, the splitting circuit 104 is activated, and the program is entered in step 501.

The routine then proceeds to step 502 wherein the number of blocks b into which the input variable length data is split and then converted into the (n, k) block codes, is determined.

The routine then proceeds to step 503 wherein it is determined whether a total number of blocks into which the input variable length data is split is less than or equal to the number of blocks b or not if data consisting of q symbols to be protected from errors with a higher degree of priority is defined as one block.

If a YES answer is obtained, then the routine proceeds to step 504 wherein the first block whose block length j1 is given by the equation below is separated from the input variable length data, and the remainder thereof is split into blocks each having the data length k.

$$j1=q \qquad (4)$$

The routine then proceeds to step 505 wherein a total length of split blocks s (i.e., a total length of the first block and the remaining split blocks) is determined.

The routine then proceeds to step 506 wherein the total length of split blocks s is subtracted from the data length of L of the input variable length data to determine a data length y of an unsplit portion of the input variable length data, and it is determined whether the data length y is greater than the number of information symbols k of the (n, k) block code or not.

If a YES answer is obtained (y>k) meaning that it is possible to form 2 or more blocks further, then the routine proceeds to step 507 wherein the unsplit portion of the input variable length data is split by a data length j3 which is given by the following equation:

$$j3=k \qquad (5)$$

As long as the data length y of the unsplit portion of the input variable length data is greater than or equal to the number of information symbols k, steps 505, 506, and 507 are repeated.

Alternatively, if a NO answer is obtained in step 506 (y≦k), then the routine proceeds to step 508 wherein the unsplit portion of the input variable length data is defined as a final block having a block length j4 which is given by the following equation:

$$j4=y \qquad (6)$$

The routine then terminates in step 510.

If a NO answer is obtained in step 503 meaning that the total number of blocks of the input variable length data if the data consisting of q symbols to be protected from errors with a higher degree of priority is defined as one block, exceeds the number of blocks b, then the routine proceeds to step 509 wherein the first block is formed with a combination of the q symbols and the immediately following symbols of a number determined according to the relation of (L-Q) % k where % is an operator for finding the remainder, and thus the equation (L-q) % k indicates the remainder of (L-q)/k.

Thus, in step 509, the input variable length data is split so that the first block has a block length j2 which is given by the following equation:

$$j2=q+(L-q) \% k \qquad (7)$$

After step 509, the routine proceeds to steps 505 and 506, as discussed above. If a YES answer is obtained in step 506, then the routine proceeds to step 507 wherein the same operation as that discussed above is performed. Alternatively, if a NO answer is obtained, then the routine proceeds to step 508 wherein an unsplit portion of the input variable length data is defined as a final block whose data length y is equal to the number of information symbols k.

A splitting program sequence carried out by the receiver 20 is the same as that discussed above, but the above equations (4), (5), (6), and (7) are changed to equations (8), (9), (10), and (11) as shown below, respectively, since it is necessary to add the number of check symbols of (n-k) to the block length in splitting the received signal.

$$j1=q+n-k \qquad (8)$$
$$j3=n \qquad (9)$$
$$j4=y+n-k \qquad (10)$$
$$j2=q+(1-q) \% k+n-k \qquad (11)$$

As apparent from the above discussion, the variable length data transceiver of the invention is so designed that if input variable length data cannot be divided by the number of information symbols k, protection of a block including a data signal to be protected from errors with a higher degree of priority is achieved by increasing the length of that block to increase redundancies of the data thereof as compared with those of data in other blocks.

As a typical example of variable length data including a data signal to be protected from errors with a higher degree of priority, there are moving picture codes provided every unit of one frame which are specified by MPEG1 or MPEG2 of the H.261, ISO/IEC standard recommended by the ITU-T. In the H.261, code data of a picture layer, a GOB layer, and a macro block layer other than a block layer is defined as a data signal to be protected from errors with a higher degree of priority. Additionally, in the MPEG1 or MPEG2, code data of layers other than a block layer is also defined as a data signal to be protected from errors with a higher degree of priority.

Figure 2:
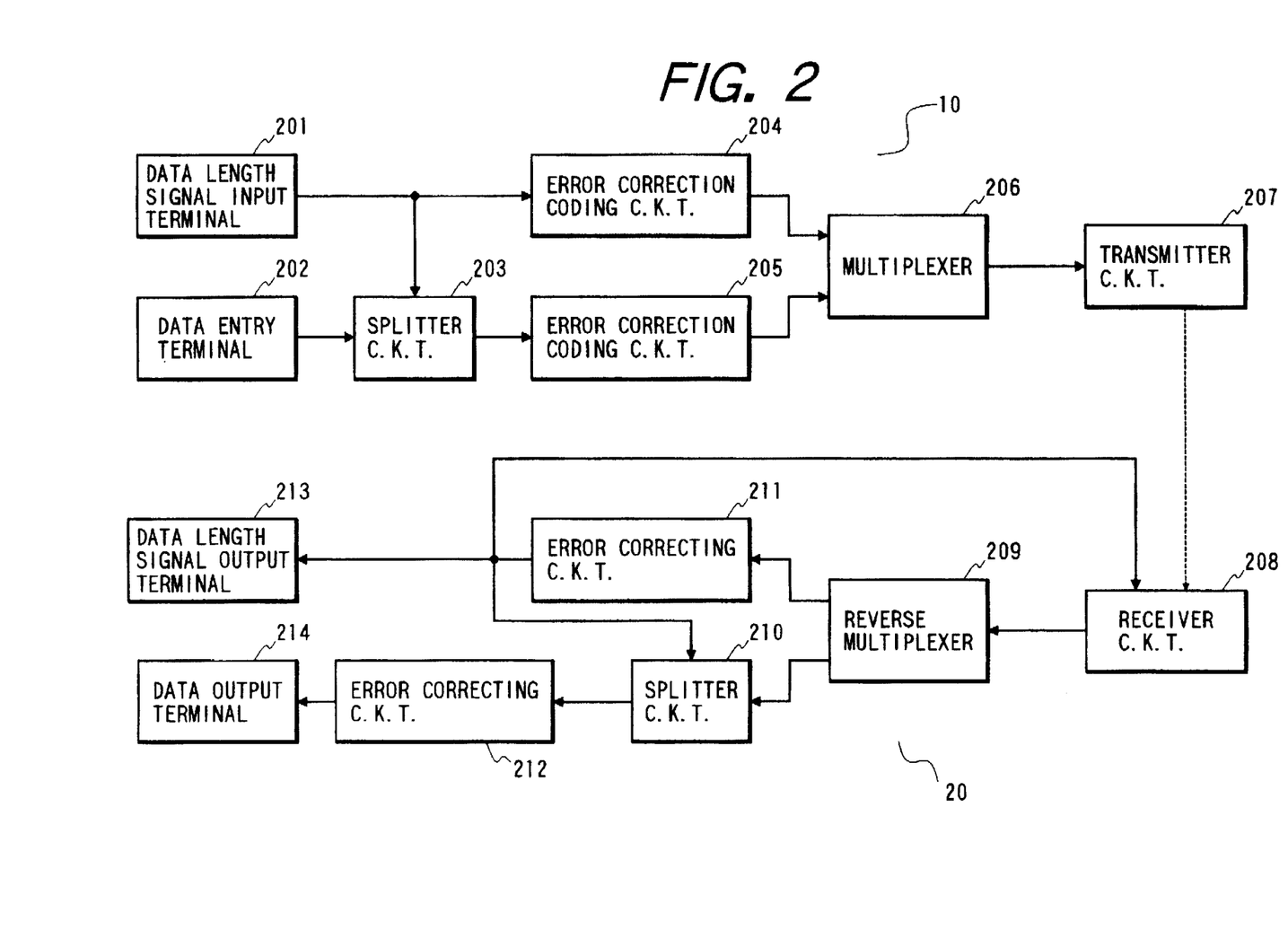
FIG. 2 is a block diagram which shows a variable length data transceiver according the second embodiment of to the present invention.

FIG. 2 shows a second embodiment of the variable length data transceiver of the invention which is designed to protect a total information content of transmission data from errors uniformly.

The variable length data transceiver of this embodiment includes a splitting circuit 203 in the transmitter 10 designed to split input variable length data into a plurality of blocks of as similar lengths as possible and a splitting circuit 210 in the receiver 20 designed to split a sequence of block signal error-correcting codes transmitted from the transmitter 10 with one-to-one correspondence to the blocks split by the transmitter 10. Other arrangements are the same as those of the conventional variable length data transceiver shown in FIG. 3, and explanation thereof in detail will be omitted here.

Figure 6:
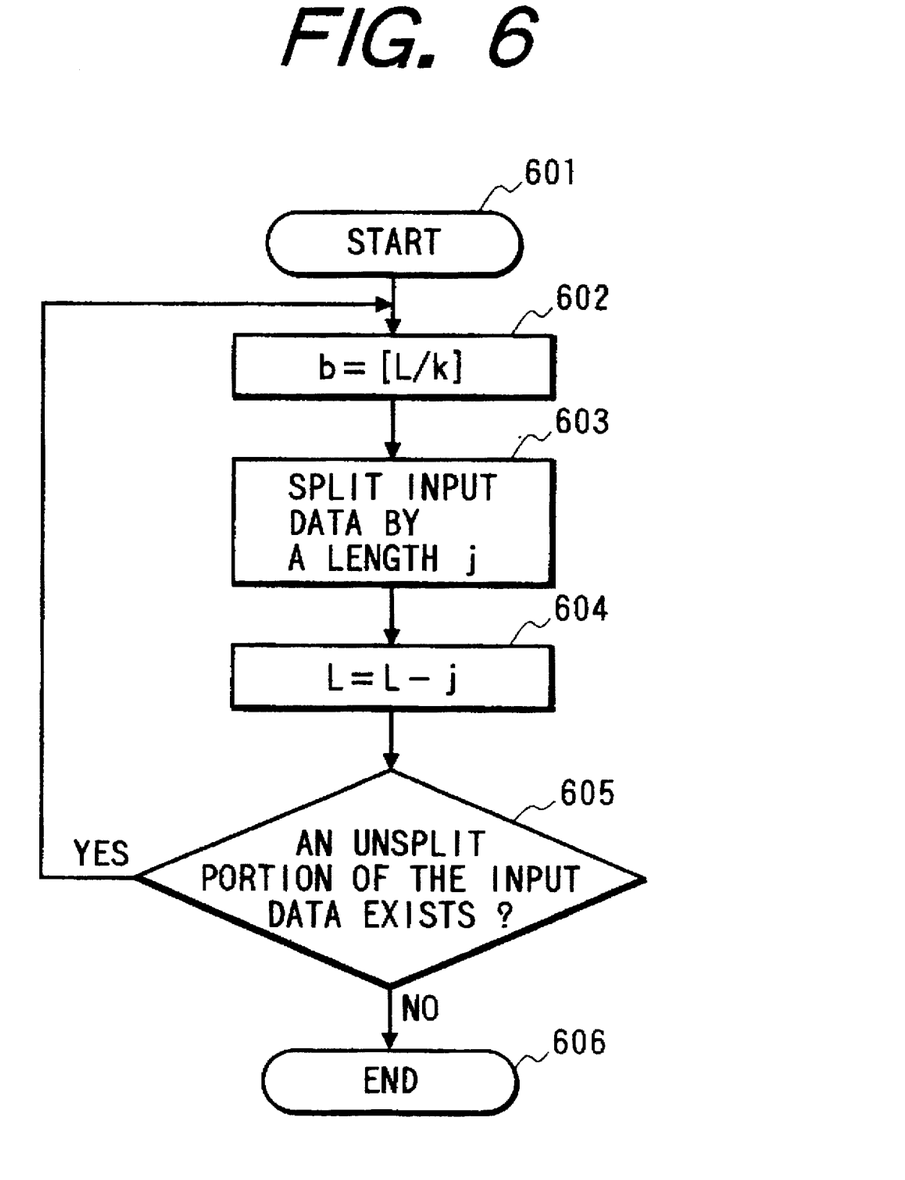
FIG. 6 is a flowchart of a program performed by the transceiver of the second embodiment shown in FIG. 2.

FIG. 6 shows a program or sequence of logical steps performed by the splitting circuits 203 and 210 which minimize differences in length between split blocks when the lengths of all the split blocks cannot exactly be matched with each other. Note that this technique may also be used when it is possible to bring the lengths of all the split blocks into agreement with each other.

Upon input of variable length data having a data length of L and a data length signal to the transmitter 10, the splitting circuit 203 is activated, and the program is entered in step 601.

The routine then proceeds to step 602 wherein the number of blocks b into which the input variable length data is to be split and then converted into the (n, k) block codes in error correction, is determined.

The routine then proceeds to step 603 wherein the input variable length data is divided by a block length j which is given by the following equation.

$$j=[L/b] \qquad (12)$$

where [L/b] indicates a minimum integer greater than a value of L/b.

The routine then proceeds to step 604 wherein the block length j is subtracted from the data length of the variable length data to determine the length of an unsplit portion of the variable length data.

The routine then proceeds to step 605 wherein it is determined whether the unsplit portion of the variable length data exists or not. If a NO answer is obtained, then the routine proceeds to step 606 wherein the program terminates. Alternatively, if a YES answer is obtained, then the routine returns back to step 602 wherein the unsplit portion of the variable length data is split.

A splitting program sequence carried out by the splitting circuit 210 of the receiver 20 is the same as that discussed above, but the above equation (12) is changed to the equation (13) as shown below since it is necessary to add the number of check symbols of (n-k) to the block length in splitting the received signal.

$$j=[L/b]+n-k \qquad (13)$$

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for transmission and reception of variable length data comprising:

a transmitter including, splitting means for splitting the variable length data into first code blocks each having a block length k, when a data length of the variable length data is not a multiple of the block length k, said splitting means converting part of the variable length data to be protected from the errors with a higher degree of priority into a second code block having a length shorter than the block length k;

error correction code converting means for converting the first code blocks into first error-correcting codes each including k information symbols and having a code length n, said error correction code converting means adding dummy bits to the second code block to convert the dummy bit-added second code block into a second error-correcting code, after which the dummy bits are removed from the second error-correcting code to provide a third error-correcting code, and transmitting means for transmitting a code sequence including the first and third error-correcting codes; and a receiver including, receiving means for receiving the code sequence transmitted from said transmitting means;

splitting mean for splitting the code sequence received by said receiving means into the first and third error-correcting codes, and error correcting means for correcting errors arising in the first and third error-correcting codes, said error correcting means adding dummy bits to the third error-correcting code to correct the errors to the third error-correcting code, after which the dummy bits are removed from the third error-correcting code.

2. An apparatus as set forth in claim 1, wherein said transmitter further includes storage means for storing therein prior protection position information which indicates which part of the variable length data should be protected from errors with the higher degree of priority, said splitting means of said transmitter splitting the variable length data into the first and second code blocks based on the prior protection position information stored in the storage means.

3. An apparatus as set forth in claim 2, wherein said receiver further includes storage means for storing therein the same prior protection position information as that stored in the storage means of the transmitter, said splitting means of the receiver identifying the third error-correcting code in the code sequence based on the prior protection position information.

4. An apparatus as set forth in claim 3, wherein said storage means of said transmitter and said receiver store as the part of the variable length data to be protected from the errors with the higher degree of priority code data of layers other than a block layer of a moving picture code provided every unit of one frame which is specified by MPEG1 or MPEG2 of the H.261, ISO/IEC standard recommended by the ITU-T.

5. An apparatus as set forth in claim 1, wherein when the data length of the variable length data does not correspond to a multiple of the block length k, said splitting means of said transmitter splits the variable length data into code blocks of as similar lengths as possible.

* * * * *